US012525731B2

(12) United States Patent
Kolodziej et al.

(10) Patent No.: US 12,525,731 B2
(45) Date of Patent: Jan. 13, 2026

(54) IN-BAND FULL-DUPLEX ANTENNA WITH DIRECTION FINDING CAPABILITY

(71) Applicant: Massachusetts Institute of Technology, Cambridge, MA (US)

(72) Inventors: Kenneth E. Kolodziej, Lexington, MA (US); David M. Bragdon, Lexington, MA (US); Pierre A. Dufilie, Marlborough, MA (US); William F. Moulder, Nashua, NH (US); Bradley Thomas Perry, Nashua, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 259 days.

(21) Appl. No.: 18/350,057

(22) Filed: Jul. 11, 2023

(65) Prior Publication Data

US 2024/0014577 A1 Jan. 11, 2024

Related U.S. Application Data

(60) Provisional application No. 63/368,110, filed on Jul. 11, 2022.

(51) Int. Cl.
*H01Q 25/00* (2006.01)
*H01Q 13/02* (2006.01)

(52) U.S. Cl.
CPC ......... *H01Q 25/00* (2013.01); *H01Q 13/0275* (2013.01)

(58) Field of Classification Search
CPC ...... H01Q 25/00; H01Q 13/0275; H01Q 9/32; H01Q 13/02; H01Q 21/205; H01Q 21/28
See application file for complete search history.

(56) References Cited

U.S. PATENT DOCUMENTS 2,939,141 A * 5/1960 Engel .................... H01Q 25/00 343/757
3,032,762 A * 5/1962 Kerr ...................... H01Q 21/20 343/771
3,422,436 A * 1/1969 Marston .................. H01Q 3/46 343/777

(Continued)

FOREIGN PATENT DOCUMENTS

WO WO 2018/218089 A1 11/2018
WO WO 2021/113314 A9 6/2021
WO WO 2021/225667 A1 11/2021

OTHER PUBLICATIONS

Ashraf et al.; "Supporting vehicle-to-everything services by 5g new radio release-16 systems"; IEEE Communications Standards Magazine—Vehicular Networking; Mar. 2020; 7 Pages.

(Continued)

*Primary Examiner* — Dameon E Levi
*Assistant Examiner* — Jordan E. DeWitt
(74) *Attorney, Agent, or Firm* — Daly, Crowley, Mofford & Durkee, LLP

(57) ABSTRACT

Described is an in-band full-duplex (IBFD) antenna having direction finding capability. The IBFD antenna includes a transmit antenna having an omnidirectional radiation pattern and a receive antenna configured to provide a plurality of difference beams. The IBFD antenna may be disposed on a moving platform to cover all angles around the moving platform.

19 Claims, 9 Drawing Sheets

(56) References Cited

U.S. PATENT DOCUMENTS 5,767,807 A * 6/1998 Pritchett .................. H01Q 3/24 343/834
6,041,232 A * 3/2000 Jennings, III .......... H01Q 19/13 455/422.1
7,155,179 B1 12/2006 Rothenberg
7,783,266 B2 8/2010 Hosokawa et al.
8,604,987 B1 * 12/2013 Doane .................. H01Q 21/061 343/893
8,749,441 B2 6/2014 Fenn et al.
9,203,455 B2 12/2015 Yang et al.
9,478,865 B1 * 10/2016 Willis .................. H01Q 21/064
9,859,992 B1 1/2018 Hogerheiden
9,887,862 B2 2/2018 Zhou et al.
9,900,019 B1 2/2018 Chang
9,909,904 B2 3/2018 Geiger
9,991,607 B1 * 6/2018 West .................. H01Q 13/0275
10,110,306 B2 10/2018 Jain et al.
10,193,236 B1 * 1/2019 Lee ........................ H01Q 21/24
10,243,718 B2 3/2019 Hong et al.
10,256,864 B2 4/2019 Eltawil et al.
10,374,656 B2 8/2019 Cox et al.
10,601,456 B2 3/2020 Tsui et al.
10,812,118 B2 10/2020 Kolodziej et al.
11,165,463 B1 11/2021 Williams
11,245,430 B1 2/2022 Huang
11,611,423 B2 3/2023 Kolodziej
11,626,966 B2 4/2023 Kolodziej et al.
12,206,173 B1 * 1/2025 West ........................ H01Q 3/20
2003/0137451 A1 * 7/2003 Cheng .................... H01Q 19/32 343/834
2005/0048921 A1 * 3/2005 Chung ................... H01Q 1/241 455/63.4
2005/0219126 A1 * 10/2005 Rebeiz ................. H01Q 25/008 343/700 MS
2007/0237270 A1 10/2007 Mezer et al.
2010/0328177 A1 * 12/2010 Kemp .................. H01Q 21/205 343/893
2013/0106667 A1 * 5/2013 Fenn ...................... H01Q 1/525 343/866
2014/0062788 A1 * 3/2014 Coleman .............. H01Q 3/2647 342/385
2014/0266894 A1 * 9/2014 Rasheed .................. H01Q 3/34 342/370
2014/0313080 A1 * 10/2014 Smith .................... H01Q 19/28 342/368
2015/0145741 A1 * 5/2015 Moulder ................ H01Q 1/525 343/773
2016/0301141 A1 * 10/2016 Del Castillo .......... H01Q 11/10
2016/0359237 A1 * 12/2016 Quan ..................... H01Q 21/24
2017/0110790 A1 * 4/2017 Kim ..................... H01Q 21/205
2017/0214429 A1 7/2017 Eistein et al.
2018/0123229 A1 * 5/2018 Stratis .................... H01Q 3/247
2018/0342807 A1 * 11/2018 Watson ................ H01Q 9/0421
2019/0173503 A1 6/2019 Kolodziej et al.
2019/0253922 A1 8/2019 Jain et al.
2020/0043461 A1 2/2020 Zollner et al.
2021/0273773 A1 9/2021 Yi et al.
2022/0050214 A1 * 2/2022 Hagen ...................... H01Q 3/28
2023/0239023 A1 * 7/2023 Kiesel .................... H04B 7/086 370/329
2024/0014577 A1 * 1/2024 Kolodziej ................ H01Q 9/32

OTHER PUBLICATIONS

Bai, et al.; "Full-Duplex in 5G Small Cell Access: System Design and Performance Aspects"; arXiv:1903.09893v1; Mar. 23, 2019; 7 Pages.

Bakshi, et al.; "Fast and Efficient Cross Band Channel Prediction Using Machine Learning"; The 25th Annual International Conference on Mobile Computing and Networking; Oct. 11, 2019; 16 Pages.

Balachandran, et al.; "Flexible Duplex in FDD Spectrum"; IEEE International Conference on Communications Workshops; May 21, 2017; 6 Pages.

Balatsoukas-Stimming; Non-Linear Digital Self-Interference Cancellation for In-Band Full-Duplex Radios Using Neural Networks; 2018 IEEE 19th International Workshop on Signal Processing Advances in Wireless Communications (SPAWC); Jan. 2018; 5 Pages.

Beach, et al; "Flexible Duplex Transceivers for 5G and Beyond Wireless Access"; 1st URSI Atlantic Radio Science Conference; May 16, 2015; 1 Page.

Bharadia, et al.; "Full Duplex Radios"; Proceedings of the ACM SIGCOMM; Aug. 27, 2013; 12 Pages.

Chen et al.; "Wideband Full-Duplex Phased Array with Joint Transmit and Receive Beamforming: Optimization and Rate Gains"; Proceedings of the Twentieth ACM International Symposium on Mobile Ad Hoc Networking and Computing; Jul. 2019; 11 Pages.

Cummings, et al.; "Neural Networks for Real-Time Adaptive Beamforming in Simultaneous Transmit and Receive Digital Phased Arrays"; IEEE International Symposium on Phased Array System & Technology; 2019; 8 Pages.

Etellisi et al.; "Broadband Full-Duplex Monostatic Circular-Antenna Arrays"; IEEE Antenna and Propagation Magazine; Oct. 2018; 16 Pages.

Everett et al.; "SoftNull: Many-Antenna Full-Duplex Wireless via Digital Beamforming"; IEEE Transactions on Wireless Communications; vol. 15, No. 12; Dec. 2016; 16 Pages.

Examiner Initiated Interview Summary dated Dec. 15, 2022 for U.S. Appl. No. 17/185,142; 2 Pages.

Final Office Action dated Sep. 29, 2022 for U.S. Appl. No. 17/185,142; 20 Pages.

Guo, et al.; "DSIC: Deep Learning based Self-Interference Cancellation for In-Band Full Duplex Wireless"; IEEE Global Communications Conference; Jan. 2019; 6 Pages.

Guo, et al.; "Realtime Software Defined Self-Interference Cancelation Based on Machine Learning for In-Band Full Duplex Wireless Communication"; 2018 International Conference on Computing, Networking and Communications (ICNC): Mobile Computing and Vehicle Communications; pp. 779-783; Jan. 2018; 5 Pages.

Hagan, et al.; "Training Feedforward Networks with the Marquardt Algorithm"; IEEE Transactions on Neural Networks; vol. 5, No. 6; Nov. 1994; 5 Pages.

Huusari, et al.: "Wideband Self-Adaptive RF Cancellation Circuit for Full-Duplex Radio: Operating Principle and Measurements"; IEEE 81st Vehicular Technology Conference; May 2015; 7 Pages.

Jain, et al.; "Practical, Real-time, Full Duplex Wireless"; Proceedings of the 17th Annual International Conference on Mobile Computing and Networking, MOBICOM 2011; Sep. 19-23, 2011; 12 Pages.

Kim, et al.; "Demo: A Reinforcement Learning-based Flexible Duplex System for B5G with Sub-6 GHz"; IEEE Wireless Communications and Networking Conference Workshops; Apr. 6, 2020; 2 Pages.

Kolodziej et al.; "Adaptive Beamforming for Multi-Function In-Band Full-Duplex Applications"; IEEE Wireless Communications—Full Duplex Communications Theory, Standardization, and Practice; Feb. 2021; 8 Pages.

Kolodziej et al.; "Evolution of Circular Mode Phasing For In-Band Full-Duplex Omnidirectional Antennas"; IEEE Transactions on Antennas and Propagation; vol. 69, No. 11; Nov. 2021; 11 Pages.

Kolodziej et al.; "In-Band Full-Duplex Technology: Techniques and Systems Survey"; IEEE Transactions on Microwave Theory and Techniques; vol. 67, No. 7; Jul. 2019; 17 Pages.

Kolodziej et al.; "Ring Array Antenna with Optimized Beamformer for Simultaneous Transmit and Receive"; Proceedings of the 2012 IEEE International Symposium on Antennas and Propagation; 2012; 2 Pages.

Kolodziej, et al.; "Adaptive Learning Rate Turning Algorithm for RF self-Interference Cancellation"; IEEE Transactions on Microwave Theory and Techniques; Sep. 2020; 12 Pages.

Kolodziej, et al.; "Machine Learning for Accelerated IBFD Tuning in 5G Flexible Duplex Networks"; IEEE/MTT-S International Microwave Symposium; Aug. 4, 2020; 4 Pages.

(56) References Cited

OTHER PUBLICATIONS

Kolodziej, et al.; "Multitap RF Canceller for In-Band Full-Duplex Wireless Communication"; IEEE Transactions on Wireless Communications; vol. 15; No. 6; Jun. 2016; 14 Pages.
Kolodziej, et al.; "Photonic-Enabled RF Canceller for Wideband In-Band Full Duplex Wireless Systems"; IEEE Transactions on Microwave Theory and Techniques; vol. 67; No. 5; May 2019; 11 Pages.
Kolodziej, et al.; "Wideband Vector Modulator for RF Cancellers in STAR Systems"; IEEE Radio and Wireless Symposium; Jan. 15, 2018; 4 Pages.
Kurzo, et al.; "Design and Implementation of a Neural Network Aided Self-Interference Cancellation Scheme for Full-Duplex Radios"; 52nd Asilomar Conference on Signals, Systems, and Computers; Oct. 28, 2018; Oct. 28, 2018; 5 Pages.
Kurzo, et al.; "Hardware Implementation of Neural Self-Interference Cancellation"; IEEE Journal on Emerging and Selected Topics in Circuits and Systems; vol. 10; No. 2; Jun. 2020; 13 Pages.
Levenberg; "A Method for the Solution of Certain Non-Linear Problems in Least Squares"; Quarterly of applied Mathematics; vol. II; No. 2; 1944; 5 Pages.
Liao; "Dynamic Uplink/Downlink Resource Management in Flexible Duplex-Enabled Wireless Networks"; IEEE International Conference on Communications Workshops; May 21, 2017; 7 Pages.
Liu, et al.; "Performance Evaluation of Flexible Duplex Implement based on Radio Frame Selection in LTE Heterogeneous Network"; 22nd International Conference on Telecommunications (ICT 2015); Apr. 27, 2015; 5 Pages.
Liu; "On the Levenberg-Marquardt Training Method for Feed-Forward Neural Networks"; 2010 Sixth International Conference on Natural Computation; vol. 1; Aug. 10, 2010; 5 Pages.
Marquardt; "An Algorithm for Least-Squares Estimation of Non-linear Parameters"; J. Soc. Indust. Appl. Math.; vol. 11; No. 2; Jun. 1963; 11 Pages.
Moulder et al.; "Wideband Antenna Array for Simultaneous Transmit and Receive (STAR) Applications"; IEEE Antennas and Propagation Society International Symposium (APSURSI); 2014; 2 Pages.
Nagulu, et al.; "Fully-Integrated Non-Magnetic 180nm SOI Circulator with >1W P1dB, >+50dBm IIP3 and High Isolation Across 1.85 VSWR"; 2018 IEEE Radio Frequency Integrated Circuits Symposium; pp. 10-107; Jun. 10, 2018; 4 Pages.
Nagulu, et al.; "Non-Magnetic 60GHz SOI CMOS Circulator Based on Loss/Dispersion-Engineered Switched Bandpass Filters"; ISSCC 2019; Session 28; Techniques for Low-Power & High-Performance Wireless 28.5; 2019 IEEE International Solid-State Circuits Conference; Jan. 2019; 3 Pages.
Non-Final Office Action dated Apr. 22, 2022, for U.S. Appl. No. 17/109,634; 11 Pages.
Non-final Office Action dated Mar. 24, 2022 for U.S. Appl. No. 17/185,142; 23 Pages.
Final Office Action dated Jun. 16, 2023 for U.S. Appl. No. 17/185,142; 18 Pages.
Ozis, et al.; "Integrated Quadrature Couplers and Their Application in Image-Reject Receivers"; IEEE Journal of Solid-State Circuits; vol. 44; No. 5; May 2009; 13 Pages.
Palaniappan, et al.; "A Spectral Shaper Based Two-Tap RF Self-Interference Canceller for Full-Duplex Radios"; IEEE/MIT-S International Microwave Symposium; Jun. 2, 2019; 4 Pages.
PCT International Search Report and Written Opinion dated May 21, 2021 for International Application No. PCT/US2021/019918; 13 Pages.
PCT Notification of Transmittal of the International Search Report and the Written Opinion of the International Searching Authority, International Search Report and Written Opinion, dated Feb. 19, 2021, for International Application No. PCT/US2020/62823; 10 Pages.
Pirinen; "Challenges and Possibilities for Flexible Duplexing in 5G Networks"; IEEE 20th International Workshop on Computer Aided Modelling and Design of Communication Links and Networks; Sep. 7, 2015; 5 Pages.
Preliminary Amendment dated Jan. 27, 2023 for U.S. Appl. No. 17/185,142; 3 Pages.
Reiskarimian, et al.; "A CMOS Passive LPTV Nonmagnetic Circulator and Its Application in a Full-Duplex Receiver"; IEEE Journal of Solid-State Circuits; vol. 52; No. 5; May 2017; 15 Pages.
Response and RCE to Final Office Action dated Sep. 29, 2022 for U.S. Appl. No. 17/185,142, filed Dec. 23, 2022; 19 Pages.
Response to Non-final Office Action dated Mar. 24, 2022 for U.S. Appl. No. 17/185,142, filed Jun. 23, 2022; 19 Pages.
Smith, et al.; "Neural Network Training With Levenberg-Marquardt and Adaptable Weight Compression"; IEEE Transactions on Neural Networks and Learning Systems; vol. 30; No. 2; Feb. 2019; 8 Pages.
Tamminen, et al.; "Digitally-Controlled RF Self-Interference Canceller for Full-Duplex Radios"; 2016 24th European Signal Processing Conference (EUSIPCO); Aug. 29, 2016; 5 Pages.
U.S. Notice of Allowance dated Dec. 12, 2022 for U.S. Appl. No. 17/186,894; 16 pages.
U.S. Supplemental Notice of Allowability dated Jan. 6, 2023 for U.S. Appl. No. 17/186,894; 3 pages.
Wan, et al.; "Evolving LTE with Flexible Duplex"; Globecom 2013 Workshop—Emerging Technologies for LTE-Advanced and Beyond 4G; Dec. 9, 2013; 6 Pages.
Wang, et al.; "Performance Comparison of Real and Complex Valued Neural Networks for Digital Self-Interference Cancellation"; 2019 IEEE 19th International Conference on Communication Technology; Oct. 16, 2019; 7 Pages.
Zhang, et al.; "Full Duplex 2X2 MIMO Radios"; 2014 Sixth International Conference on Wireless Communications and Signal Processing (WCSP); 2014; 6 Pages.
Zhan, et al.; "Full Duplex Dual-Band Radio Dedicated to Flexible Radio Communications"; Research Report No. 8558; Jul. 4, 2014, 17 Pages.

* cited by examiner

IN-BAND FULL-DUPLEX ANTENNA WITH DIRECTION FINDING CAPABILITY

CROSS REFERENCE SECTION

This application claims the benefits of U.S. Provisional Application No. 63/368,110 filed on Jul. 11, 2022. The entire contents of this application is incorporated herein by reference.

STATEMENT REGARDING FEDERALLY SPONSORED RESEARCH

This invention was made with government support under W56KGU-21-C-0035 awarded by the U.S. Army Research Office. The government has certain rights in the invention.

BACKGROUND

In-band full-duplex (IBFD) systems operate in full-duplex mode, where a signal is transmitted and received on the same frequency at the same time. This scheme is challenging to implement because an effective system requires a high amount of isolation between a co-located transmitter and receiver in order to avoid self-interference (SI). Minimizing the amount of transmit signal power coupled to the receiver helps to avoid saturating the receiver and thus allows the reception of weak signals from remote users. IBFD systems typically minimize SI by using multiple layers of cancellation, the first of which is the antenna.

Furthermore, while conventional IBFD antennas may effectively suppress SI, they do not provide any insight into a direction from which the signals are received. For such a capability, IBFD directional phased arrays have been investigated, but IBFD directional phased arrays are expensive, complex to manufacture and complex to operate.

SUMMARY

This Summary introduces a selection of concepts in simplified form that are described further below in the Detailed Description. This Summary neither identifies key or essential features, nor limits the scope, of the claimed subject matter.

Described is an in-band full-duplex (IBFD) array antenna. IBFD antennas provided in accordance with the concepts described herein provide both omnidirectional radiation-pattern coverage and direction-of-arrival (DoA) estimation of the received signals (i.e., IBFD antennas provided in accordance with the concepts described herein have a direction finding (DF) capability). Thus, IBFD antennas provided in accordance with the concepts described herein integrate a unique receive beamforming functionality which can be used to provide information indicative of a direction from which signals are received. Such DF information can be used to improve communications links. Accordingly, IBFD antennas provided in accordance with the concepts described herein find use in wireless communications and other applications.

Omnidirectional phasing is achieved using circular modes and a plurality of appropriately configured and fed wideband horn antennas are configured to provide a plurality of difference antenna beams.

Furthermore, IBFD antennas implemented in accordance with the concepts described herein provide a mechanism to access frequency spectrums more efficiently as well as host multiple functions (e.g., transmit functions, receive functions and direction-finding functions) at the same time.

IBFD techniques enable wireless systems to simultaneously utilize the same frequency band for transmit and receive operation. Using the same frequency band for transmit and receive operations can help propel the adoption of V2X systems by allowing platforms to not only connect to multiple networks concurrently, but also to do so while reducing (and ideally, minimizing) use of a frequency spectrum (i.e., by using the same frequency band for transmit and receive operations, spectral utilization is minimized). This may be accomplished using antenna designs, including those for vehicles, which combat self-interference (SI) resulting from the use of the same frequency band for transmit and receive operations and also provide direction finding capability.

In accordance with one aspect of the concepts disclosed herein, described is an in-band full-duplex (IBFD) antenna comprising a means to provide an omnidirectional radiation pattern around a moving platform, wherein the moving platform is attached to a vehicle; and a means to perform adaptive beam forming in a receive mode of operation.

In one embodiment, an IBFD antenna comprises a single omnidirectional transmit monopole antenna element for use in a transmit mode of operation and a plurality of horn antenna elements configured for use in a receive mode of operation. In embodiments, the plurality of horn antenna elements are provided as wide-angle short horn antenna elements.

In embodiments, the plurality of horn antenna elements are disposed in a first plane and the monopole antenna element is disposed in a second, different plane.

In embodiments, eight wide-angle short horns comprise two sets of four probe-fed wide-angle short horns. In one embodiment, a first set of four probe-fed wide-angle short horns are disposed above a second set of four probe-fed wide-angle short horns. Each set of four probe-fed wide-angle short horns generate a total of four difference patterns in azimuth on receive.

In one embodiment, the antenna is provided having cylindrical shape.

In one embodiment, the probe feeds are oriented at 180 degrees on opposing sides of the cylindrical array.

In one embodiment of the disclosure herein, the antenna is pole-mounted on top of a vehicle.

IBFD antennas provided in accordance with the concepts described herein find application in a wide variety of applications including but not limited to wireless networking applications, wireless communication applications and other applications. It is noted that wireless networking specifications may contain provisions related to vehicle-to-everything (V2X) operation that can enable advanced driving functions, such as collision avoidance, cooperative lane change and remote driving options. In addition to these driving aides, V2X nodes may be tasked with performing multiple simultaneous functions, such as radar, communications and spectral sensing, which can be demanding for a wireless device operating in a traditional time-division duplex mode.

BRIEF DESCRIPTION OF THE DRAWINGS

The manner and process of making and using the disclosed embodiments may be appreciated by reference to the figures of the accompanying drawings which form a part this application, and which show, by way of illustration, specific example implementations and are referred to in the following Detailed Description. Other implementations may be made without departing from the scope of the disclosure. It should thus be appreciated that like reference numerals designate corresponding parts throughout the different views and components and structures illustrated in the figures are not necessarily to scale, emphasis instead being placed upon illustrating the principals of the concepts described herein. Furthermore, embodiments are illustrated by way of example and not limitation in the figures, in which.

DETAILED DESCRIPTION

Described is an in-band full-duplex (IBFD) array antenna and system. IBFD antennas and systems provided in accordance with the concepts described herein provide omnidirectional phasing using circular modes and integrating a unique receive adaptive beamforming functionality (which provides direction-finding capability on receive) applicable for use in wireless communications and other applications.

In particular, IBFD systems provided in accordance with the concepts described herein have a direction-finding (DF) capability. Thus, IBFD systems provided in accordance with the concepts described herein provide information indicative of a direction from which signals are received. Such DF information can be used to improve communications links. For example, DF information can be used by one or both of receive and/or transmit systems of an IBFD systems. For example, DF information can be used by one or more components of IBFD receive systems (e.g., components in an IBFD receive system such as RF and/or IF receivers and processors) to reduce (and ideally minimize) intentional/unintentional interference from external sources. DF information can also be used by one or more components in an IBFD transmit system to increase antenna gain in a direction of interest.

Figure 1:
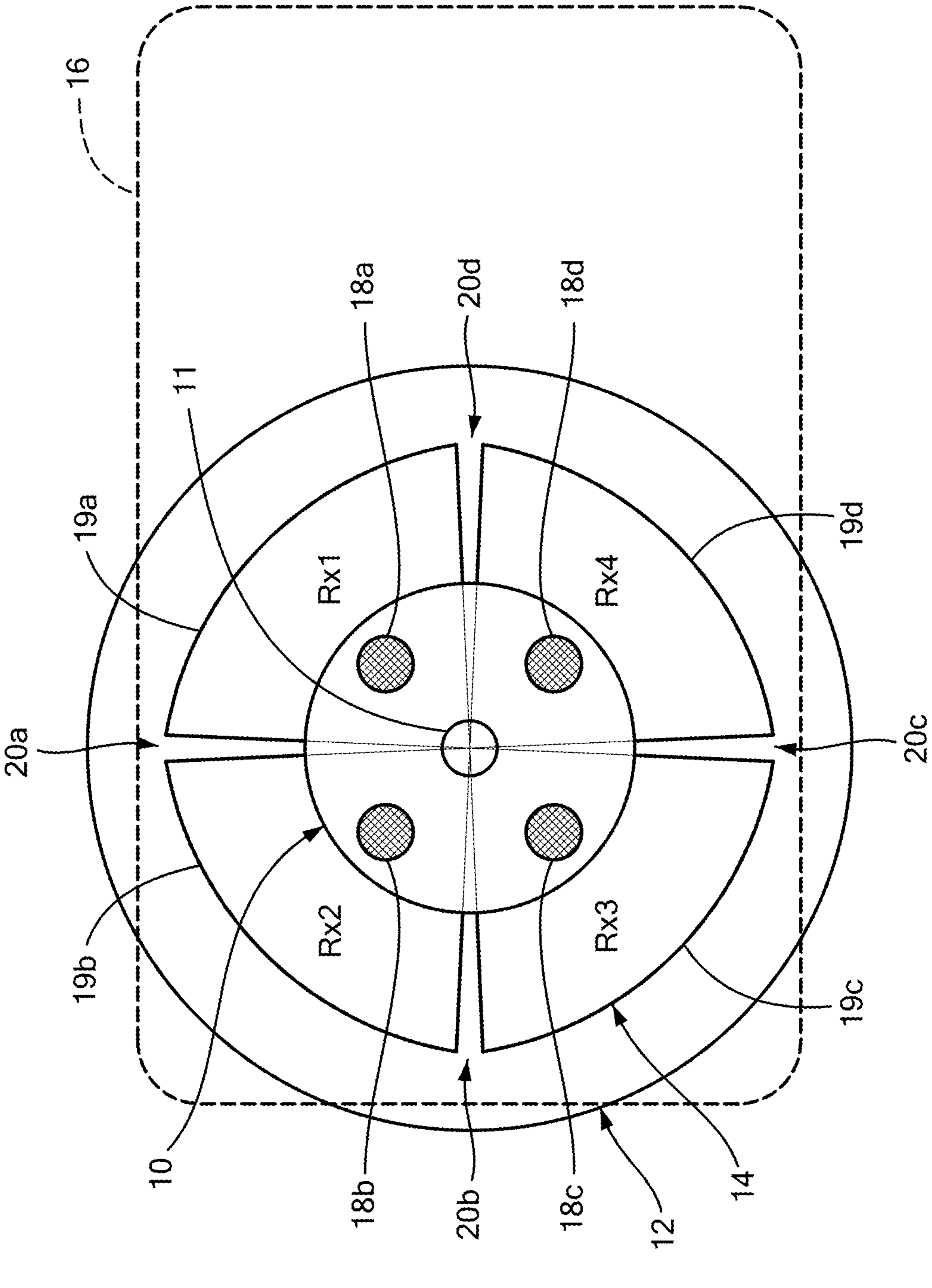
FIG. 1 is a block diagram of a vehicle-mounted in-band full-duplex (IBFD) antenna having an omnidirectional transmit pattern and four receive patterns used for beamforming.

Referring now to FIG. 1, an example in-band, full-duplex (IBFD) array antenna 10 comprises a first antenna 11 having a substantially omnidirectional antenna pattern 12 which may be used, for example, in a transmit mode of operation of IBFD array antenna 10. Antenna 11 may comprise one or more antenna elements. For example, Antenna 11 may comprise one or more monopole, horn or monocone antenna elements. Any arrangement or type of antenna elements which provide a substantially omnidirectional antenna pattern may be used.

IBFD antenna array further comprises a second antenna generally denoted 14. In this example embodiment, antenna 14 comprises one or more sets of four wide-angle short horn antennas 16*a*-16*d* fed by respective ones of feed elements (or circuits) 18*a*-18*d*. In embodiments, feed elements 18*a*-18*d* are provided as probe feeds. Thus, wide-angle short horn antennas are sometimes referred to herein as probe-fed wide-angle short horn antennas.

The probe-fed wide-angle short horn antennas are disposed or otherwise configured to generate difference patterns having pattern segments 19*a*, 19*b*, 19*c*, 19*d*, which form difference pattern nulls 20*a*-20*d*.

In embodiments, the probe feeds 18*a*-18*d* (and thus the associated antenna elements) are oriented (both physically and electrically) at 180 degrees from the opposing sets. That is, the antenna elements/probes on opposing sides are fed 180-degrees out of phase. Thus, in the example embodiment of FIG. 1, antenna elements, 18*a* and 18*c* have a 180-degree phase difference and antenna elements 18*b* and 18*d* have a 180-degree phase difference (e.g., probe 18*a* is 180° out of phase from probe 18*c* and probe 18*b* is 180° out of phase from probe 18*d*).

The difference patterns 19*a*-19*d* are achieved using a combination of the physical horn arrangement and the above-described phasing. While DF could be achieved with the physical arrangement alone, the addition of the above-described phasing enables full-duplex capability.

Furthermore, orienting probe feeds at 180 degrees for opposing sets avoids the need for a balun which may otherwise be required to generate difference patterns. Thus, the arrangement of antenna elements and feeds described herein avoids the need for a balun to generate difference patterns.

In the example embodiment of FIG. 1, IBFD array antenna 10 is disposed on a moving platform 16 (with moving platform 16 shown in phantom since it is not properly a part of antenna 10) with antenna 10 having a radiation pattern which covers all angles around the moving platform (i.e., 360-degree field of view coverage around the moving platform). Moving platform 16 may be provided as any type of ground-vehicle, water-vehicle or air-vehicle.

Omnidirectional antenna 11 may achieve relatively high amounts of isolation between transmit and receive signal paths using circular mode phasing for designs with monopole, horn and monocone elements.

Thus, antenna 10 integrates the use of a circular mode phasing technique with the ability to perform adaptive beamforming on receive.

This added benefit provides an IBFD system comprising such an IBFD antenna with the capability of estimating a signal's direction of arrival, which can improve communication-link performance for vehicle communication systems (e.g., vehicle-to-everything communication systems such as V2X, V2V and V2I systems) and other applications.

Figure 2:
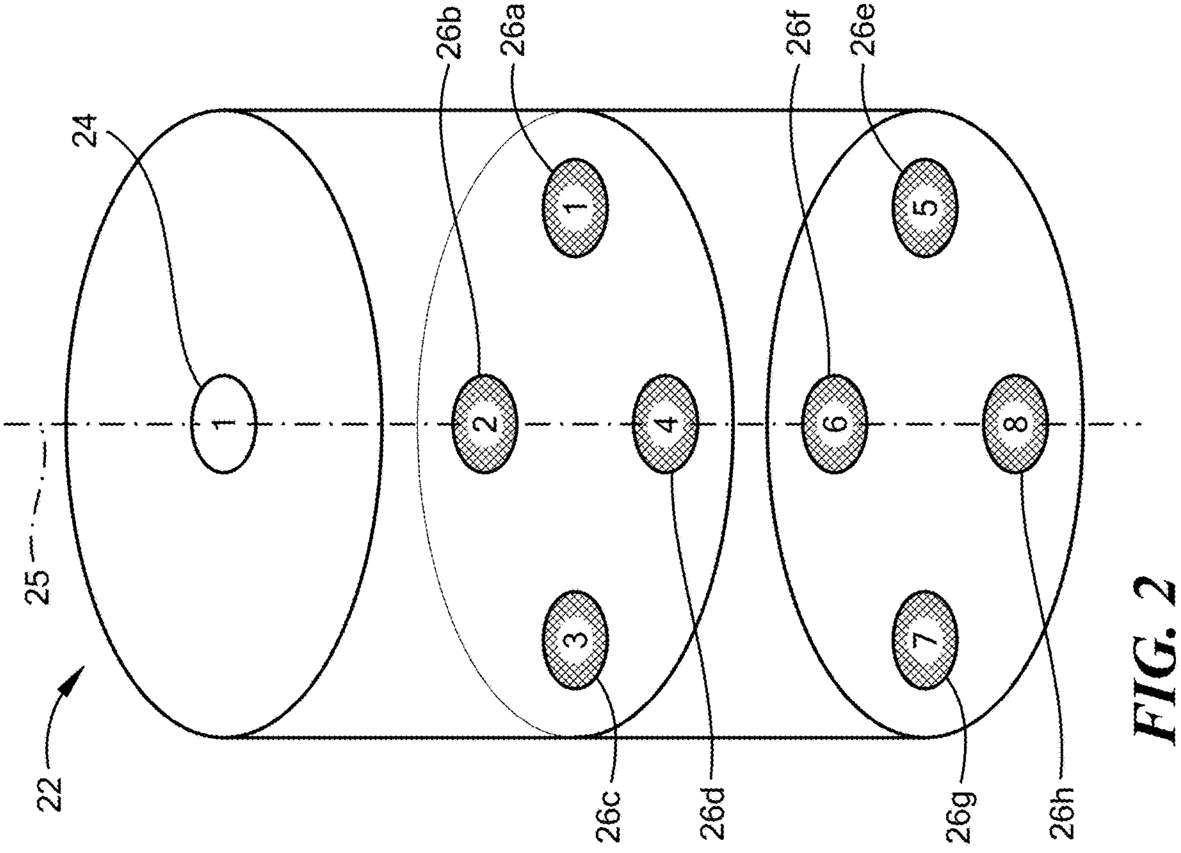
FIG. 2 is a block diagram of an IBFD antenna having a single transmit antenna element and eight (8) receive antenna elements.

Referring now to FIG. 2, an IBFD antenna 22 comprises a single transmit antenna element 24 and eight (8) receive antenna elements 26*a*-26*h*. The receive antenna elements are disposed in two spaced apart planes. In this example, four (4) receive antenna elements 26*a*-26*d* are disposed in a first plane and four (4) receive antenna elements 26*e*-26*h* are disposed in a second, different plane. In this example embodiment, the receive antenna elements are disposed in each plane are disposed in a circular pattern. The receive antenna elements may be the same as or similar to the probe-fed wide-angle short horn antennas described below in conjunction with FIGS. 3A, 3B. As can be seen in FIG. 2, the transmit antenna is disposed at or about a center point of the receive antenna elements (e.g. along a central longitudinal axis 25 of antenna 22). In embodiments, the transmit antenna is disposed in a plane which is different than the plane in which the receive antenna elements are disposed. In embodiments, transmit antenna may be disposed in a plane which is either in, above or below a plane in which receive antenna elements are disposed.

To generate difference patterns and implement adaptive beamforming, this example antenna embodiment requires zero (0) analog splitters, four (4) analog combiners and has zero (0) pattern ambiguities. This configuration allows for the combination of opposing pairs with the resulting channel count of four. It should be noted the self-interference (SI) is the same for elements on the first ring (numbers 1-4) and then the second ring (numbers 5-8).

Figure 2A:
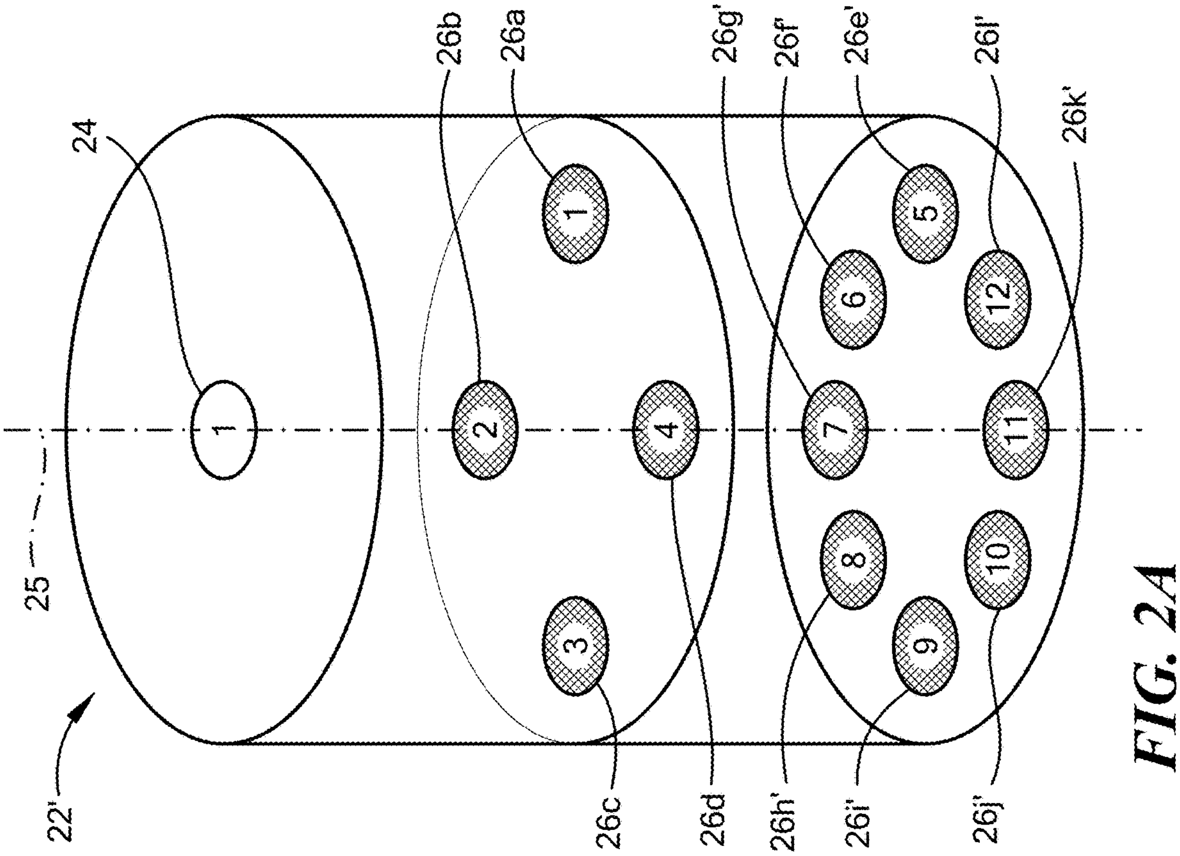
FIG. 2A is a block diagram of another IBFD antenna having a single transmit antenna element and twelve (12) receive antenna elements.

Referring now to FIG. 2A, another IBFD antenna 22' comprises a single transmit antenna element 24 and twelve (12) receive antenna elements 26*a*-26*d* and 26*e'*-26*l'*. The receive antenna elements are disposed in two spaced apart planes. In this example, four (4) receive antenna elements 26*a*-26*d* are disposed in a first plane and eight (8) receive antenna elements 26*e'*-26*l'* are disposed in a second, different plane. Accordingly, the number of antenna elements disposed in the first plane is different than the number of antenna elements disposed in the second plane.

Figure 3A:
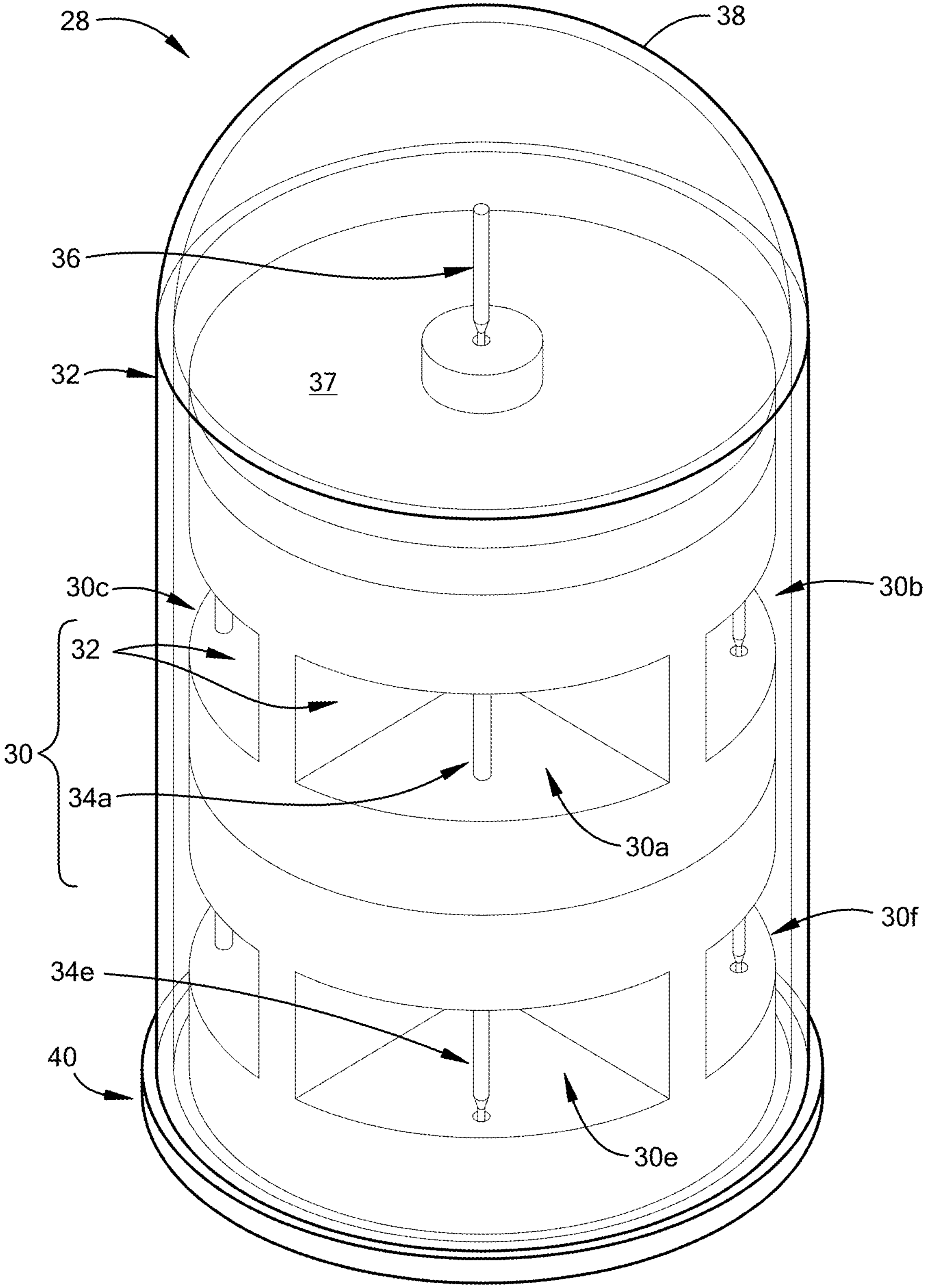
FIG. 3A is an isometric view of an IBFD antenna having a single monopole antenna which may be used in an antenna transmit mode of operation and eight (8) wide-angle short horns which may be used in an antenna receive mode of operation.
Figure 3B:
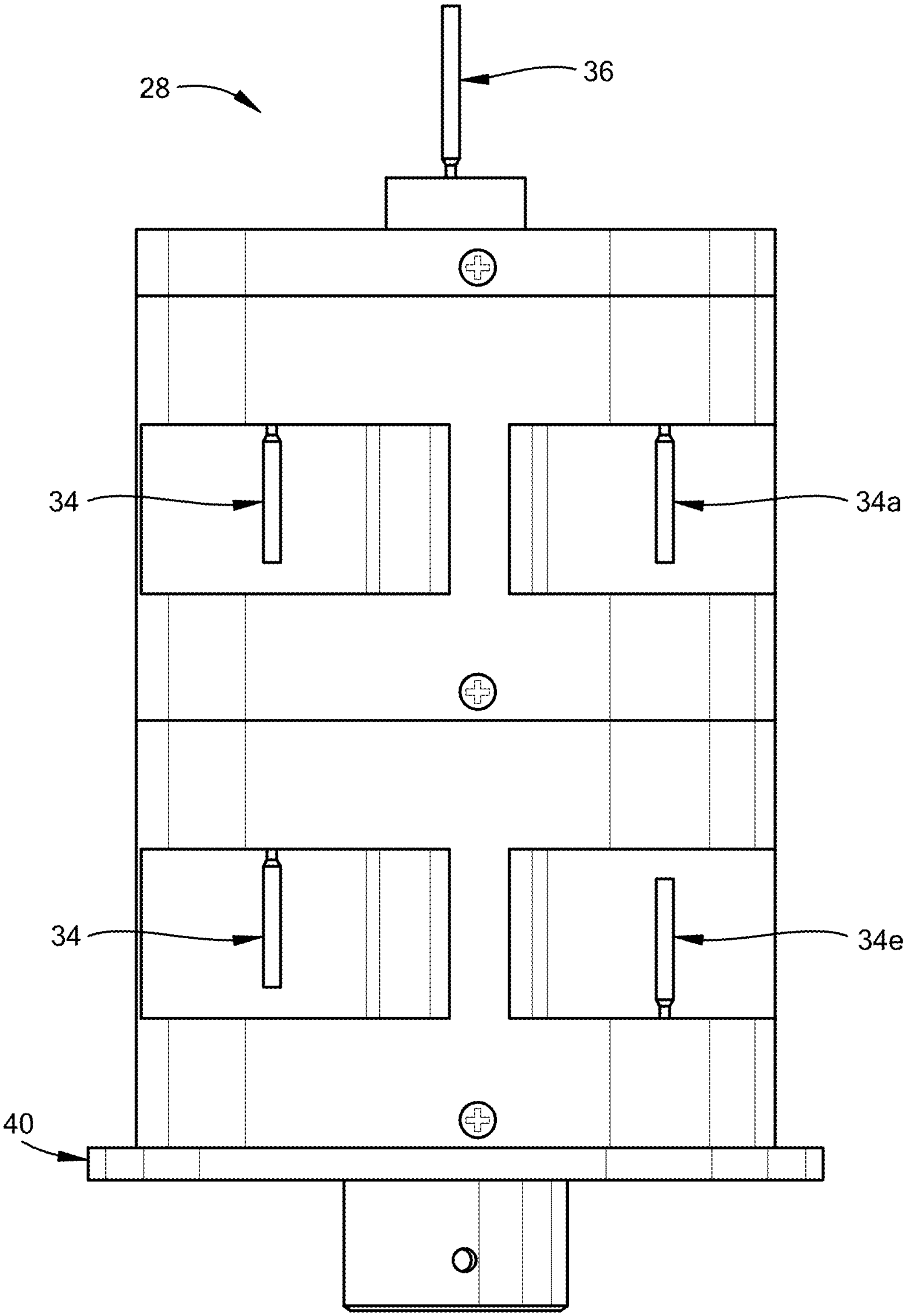
FIG. 3B is a side view of the IBFD antenna of FIG. 3A having the radome removed.

Referring now to FIGS. 3A and 3B in which like elements are provided having like reference designations, an example embodiment of an IBFD array antenna 28 comprises a plurality of horn antenna elements, here eight antenna elements 30*a*-30*h* (with horn antenna elements 30*d*, 30*h* not visible in this view). Horn antenna elements 30*a*-30*h* may be the same as or similar to probe-fed wide-angle short horn antenna elements 21*a*-21*d* described above in conjunction with FIG. 1. The elements in FIGS. 3A, 3B that are 180-degrees out of phase are fed from the top/bottom of the horn (e.g., probe 34*a* is fed from the top of horn 30*a* and probe 34*b* is fed from the bottom of horn 30*b*). This arrangement eliminates the need for a balun.

In this example embodiment, the horn antenna elements 30*a*-30*h* comprise wide-angle short horn antennas 32 fed by respective ones of probe feed elements 34. The plurality of horn antenna elements 30*a*-30*h* are arranged as two sets of four probe-fed wide-angle short horn antenna elements with antenna elements 30*a*-30*d* comprising a first set and antenna elements 30*e*-30*h* comprising a second set. A first one of the two sets of horn antenna elements is disposed above a second one of the two sets of horn antenna elements.

In this example embodiment, one set of four probe-fed wide-angle short horn antenna elements are physically disposed above a second set of four probe-fed wide-angle short horn antenna elements.

Opposing sets of probe feeds 34 are oriented at 180 degrees to avoid the need for a balun in generating a difference patterns (e.g., such as difference pattern 14 in FIG. 1). Thus, each set of four probe-fed wide-angle short horn antenna elements generate a total of four difference patterns in azimuth on receive. It is noted each set of our (4) horn antennas generates two (2) difference patterns, so two sets of four (4) horn antenna elements are required to generate the four (4) difference patterns illustrated in FIG. 3C.

As can be seen in FIG. 3A, antenna elements 30*a*-30*h* are disposed to provide array 28 as a cylindrical array 28. Array 28 further comprises an omnidirectional monopole antenna 36 having a substantially omnidirectional antenna pattern. Omnidirectional monopole antenna 36 may be used, for example, in a transmit mode of operation of IBFD array antenna 28. Omnidirectional monopole antenna 36 is disposed over a ground plane 37 and is disposed above at least one of the two sets of probe-fed wide-angle short horn antenna elements In embodiments, a radome 38 may be disposed over antenna 28. In the example of FIG. 3A, radome 38 and antenna 30 may be coupled to a base 40.

In embodiments, commercial off-the-shelf (COTS) power combiners may be used to combine the feeds that are on the opposing sides of cylindrical array 28.

In one example embodiment, antenna elements 30 are tuned for operation at 1.88 GHz and radome 38 is provided from a plastic material having a relative dielectric constant of about 3.0. In embodiments, plastic radome may have a thickness of about ⅛-inch. In embodiments for operation at 1.88 GHz, the overall assembly shown in FIG. 2 may be about 10.5 inches tall with an outer diameter of about 5.7 inches.

It should, of course, be appreciated that antenna 28 may be scaled for operation over a wide range of frequencies. The general principle of combining in-band full-duplex and direction-of-arrival estimation is scalable to other frequency bands. Additionally, increasing a number of antenna elements within the receive array would improve resolution of angle-of-arrival information.

It is also appreciated that incorporation of additional receive arrays in a similar manner would provide for the ability to also discriminate an elevation angle of incoming signals (as opposed to the azimuth-angle information already provided).

In embodiments antenna 28 may be pole-mounted on top of a vehicle. In such embodiments, it would be desirable to provide antenna 28 as compact in size and low in weight.

Figure 4:
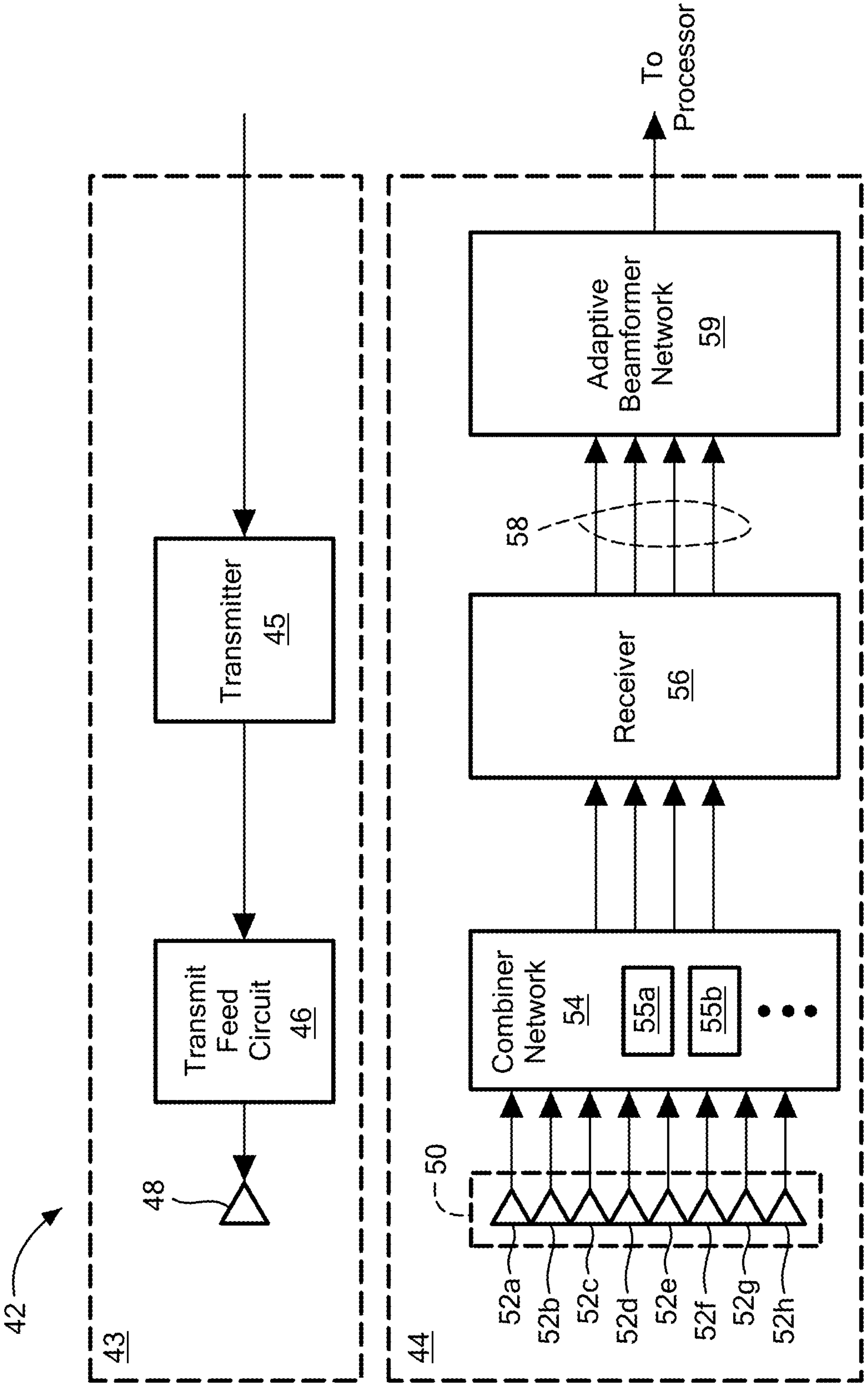
FIG. 4 is a block diagram of an IBFD system capable of performing adaptive beam forming and direction finding.

Referring now to FIG. 4 an IBFD system 42 includes transmit and receive signal paths 43, 44. Transmit signal path 43 comprises a transmitter 45 which provides a transmit signal to a transmit antenna 48 via a transmit feed circuit 46. In embodiments, transmit antenna 48 may be provided, for example, as one or more monopole, horn or monocone antenna elements.

Receive signal path 44 comprises a receive antenna 50 comprising an array of N antenna elements (where N is an integer greater than or equal to 2) with this example embodiment comprising eight (8) antenna element 52*a*-52*h*. Receive Antenna 50 is configured to receive (or intercept) RF signals and provide the RF signals to a combiner network 54.

Combiner network 54 combines the RF (analog) signals provided thereto and provides a set of analog signals (here four analog signals corresponding to receive signals Rx 1-Rx 4) to an M channel receiver 56 where M is an integer greater than or equal to 2. In this example embodiment, receiver 56 is illustrated as a four (4) channel receiver having four inputs and four outputs. Receive-56 comprises an appropriate combination of one or more filter circuits, one or more amplifiers (e.g., low noise amplifiers), one or more downconverter circuits (e.g. RF mixers) and one or more analog to digital converter circuits (DACs) and provides a digital signal (e.g. a stream of digital bits) via one or more digital signal paths 58 (e.g. a bus such as a parallel or serial bus) to an adaptive beamformer network 59 (or more simply, "adaptive beamformer" 59).

Figure 3C:
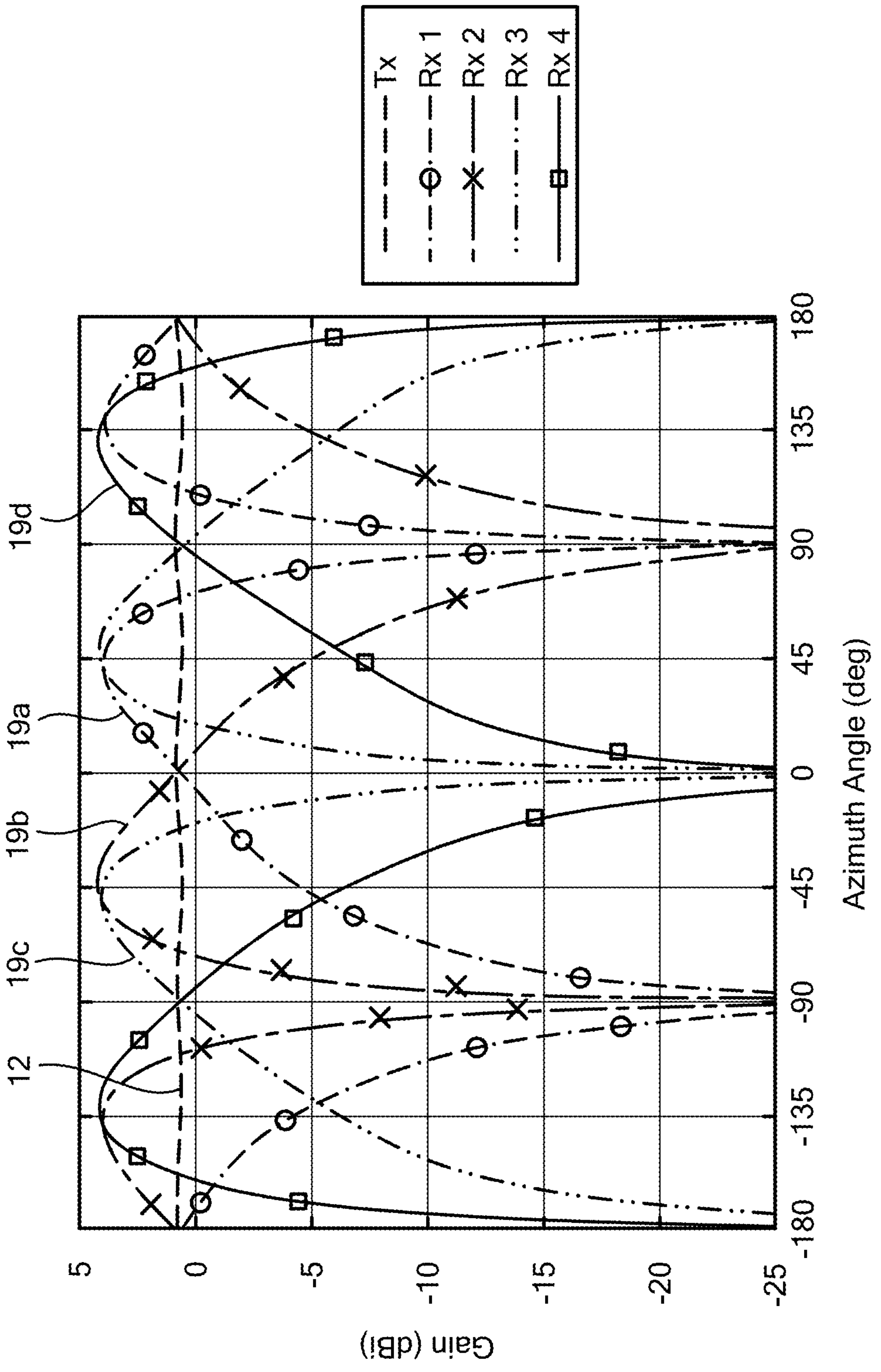
FIG. 3C is a plot of gain (dBi) vs. azimuth angle (degrees) of an IBFD antenna which may be the same as or similar to the IBFD antenna of FIG. 3A.

Adaptive beamformer 59 implements an adaptive beamforming process to form a plurality of difference beams such as those shown in FIG. 3C. The particular difference patterns produced by adaptive beamforming network 59 will depend upon a variety of factors including but not limited to: the number, type and configuration of receive antenna elements, the combining characteristics of the combiner network and the number of channels in the receiver.

In embodiments, adaptive beamforming network 59 utilizes a process to (ideally) maximize signal-to-interference-plus-noise ratio (SINR) in a manner which may be the same as or similar to a Minimum Variance Distortionless Response (MVDR) process. It should, however, be appreciated that unlike MVDR, the adaptive beamforming process does not assume knowledge of the array response in a known signal of interest (SOI) direction. Rather, the adaptive beamforming process uses a known training sequence embedded in the SOI, first by detecting and synchronizing to training data, then estimating the SDI's unknown array response. Those results are used to estimate MVDR-type array weights. The adaptive beamforming process used herein is thus sometimes referred to as "Minimum Variance Distortionless Response (MVDR) for Uncalibrated Arrays (MUA)." The output of adaptive beamformer network may then be provided to one or more processors (not shown in FIG. 4) for further processing (e.g., to utilize DF information).

Figure 5:
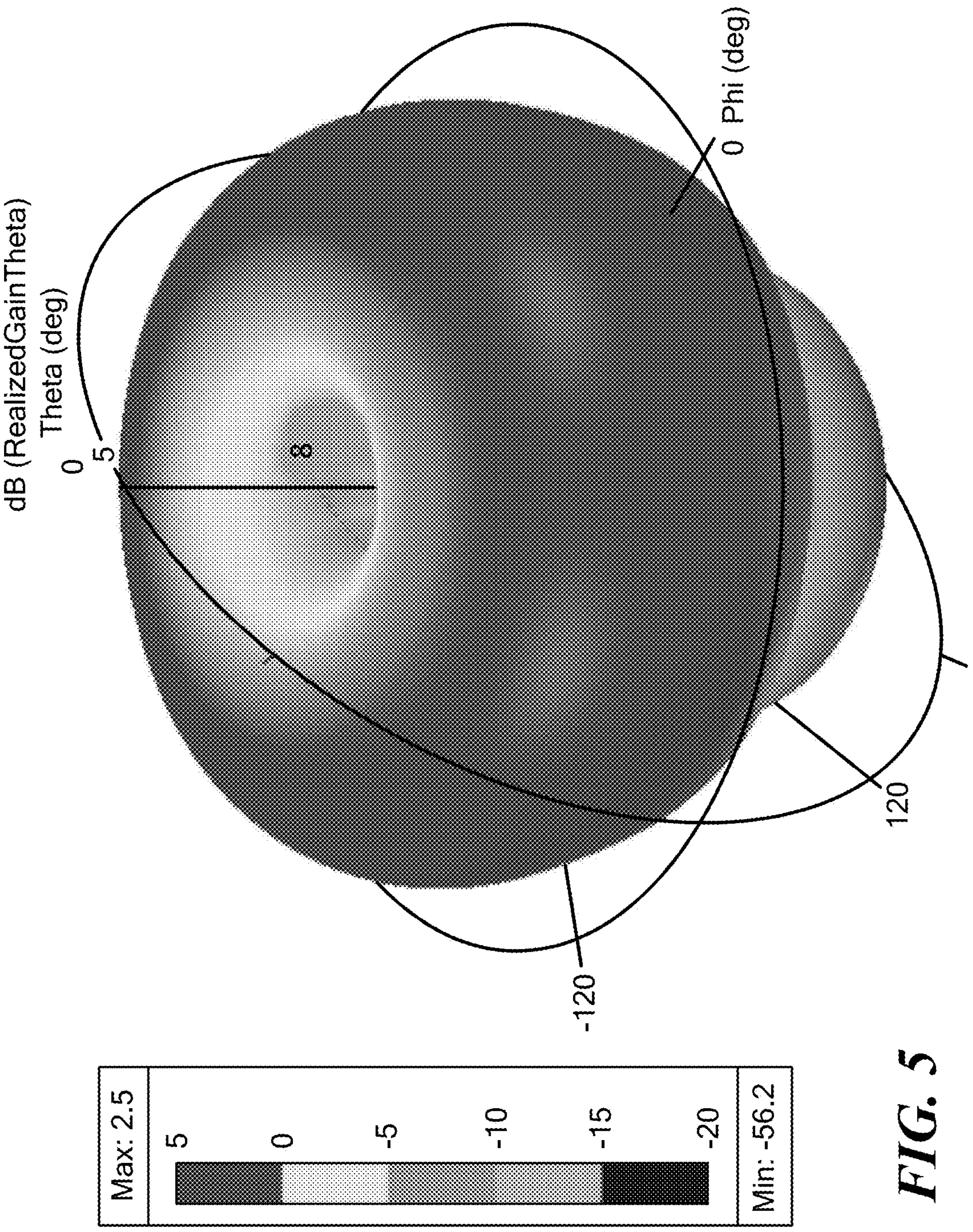
FIG. 5 is a three-dimensional (3D) polar plot of antenna gain pattern for an IBFD monopole antenna.

Referring now to FIG. 5, a three-dimensional (3D) polar plot of an antenna gain pattern for an IBFD monopole antenna which may be the same as or similar to the transmit monopole antennas described above in conjunction with FIGS. 1, 2, 3A, 3B and 4-8 shows the transmit antenna has substantially omnidirectional gain pattern. Thus, it can be seen that a transmit monopole element on top of the antenna (e.g., as shown in FIGS. 2, 3A, 3B and 7) provides a good omnidirectional radiation pattern.

Figure 6:
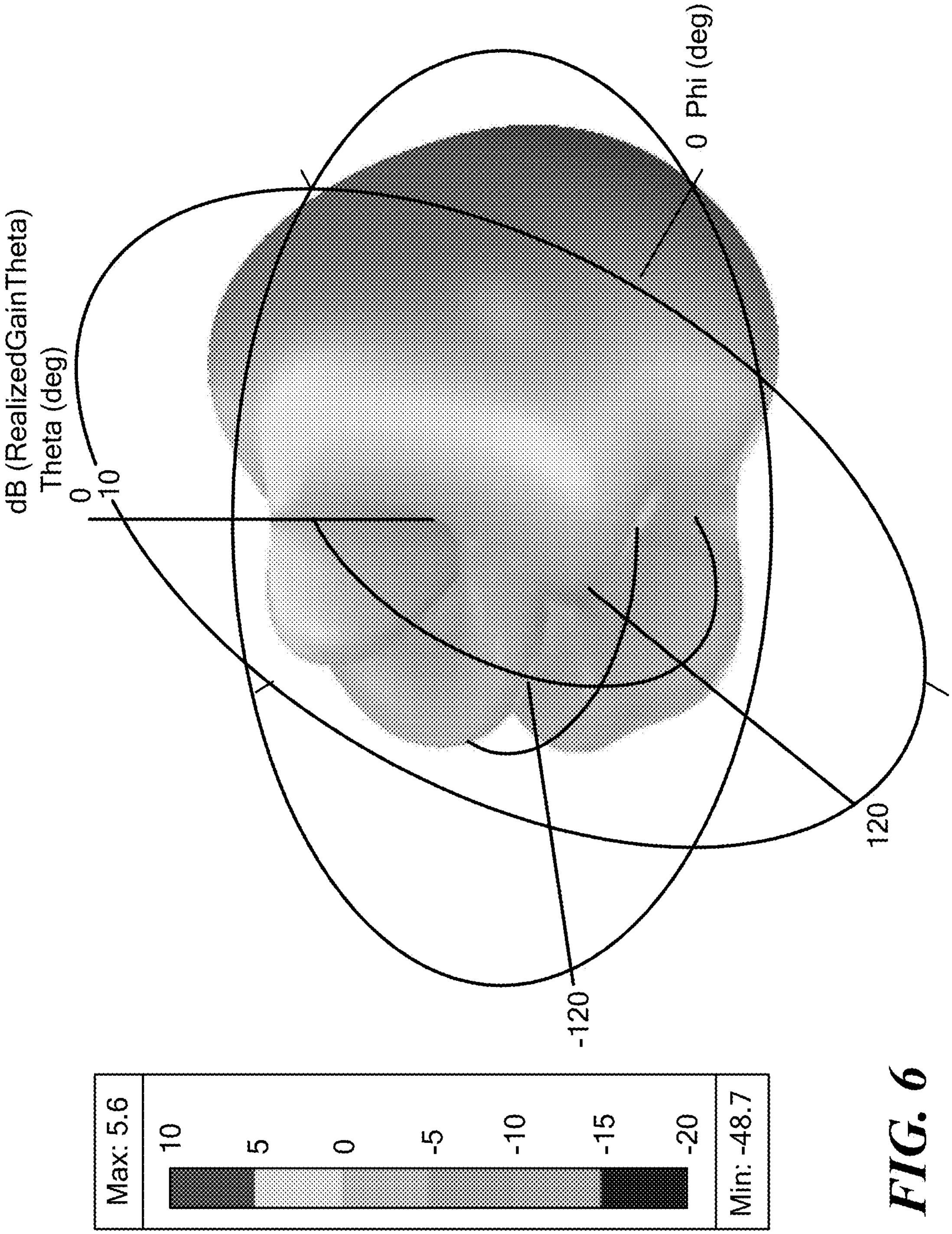
FIG. 6 is a three-dimensional (3D) polar plot of antenna gain patterns a receive wide-angle short horn.
Figure 7:
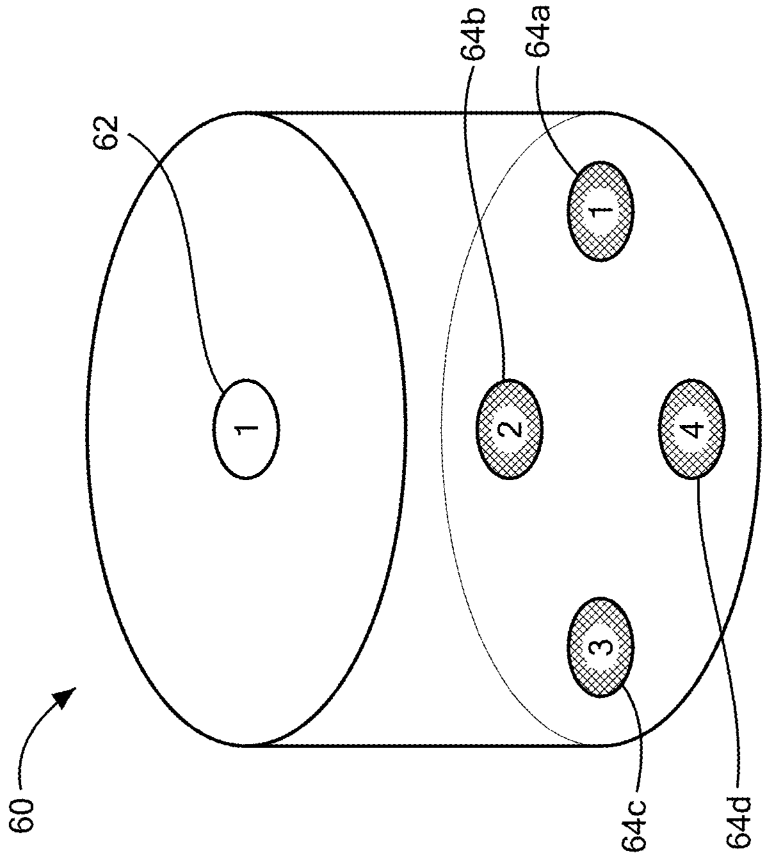
FIG. 7 is a block diagram of an IBFD antenna having a single transmit antenna element and four (4) receive antenna elements.

Referring now to FIG. 6, a three-dimensional (3D) polar plot of antenna gain pattern illustrates the directional nature of a wide-angle short horn antenna element which may be the same as or similar to one of the wide-angle short horn antenna elements shown in FIG. 3A Referring now to FIG. 7, an example IBFD antenna comprises a single transmit antenna element 62 and four (4) receive antenna elements 64*a*-64*d*. The receive antenna elements are disposed in a single plane. In this example embodiment, the receive antenna elements are disposed in a circular pattern in a single plane. The receive antenna elements may be the same as or similar to the probe-fed wide-angle short horn antennas described above in conjunction with FIGS. 3A and 3B. As can be seen in FIG. 6, the transmit antenna is disposed at or about a center point of the four (4) receive antenna elements. In embodiments, transmit antenna is disposed in a plane which is different than the plane in which the receive antenna elements are disposed. In embodiments, transmit antenna may be disposed in a plane which is either above or below the plane in which the receive antenna elements are disposed.

To generate difference patterns and implement adaptive beamforming, this example antenna embodiment requires four (4) analog splitters, four (4) analog combiners (which may, for example, be provided as part of a combiner network such as combiner network 54 in FIG. 4) and has zero (0) pattern ambiguities. It should be appreciated that the designs described herein assume the use of four (4) receive channels, (which is a common number in state of the art systems). Since this example antenna structure only has four elements, it is possible to provide the 180-degree combinations in such a way that it doesn't create the ambiguities.

Figure 8:
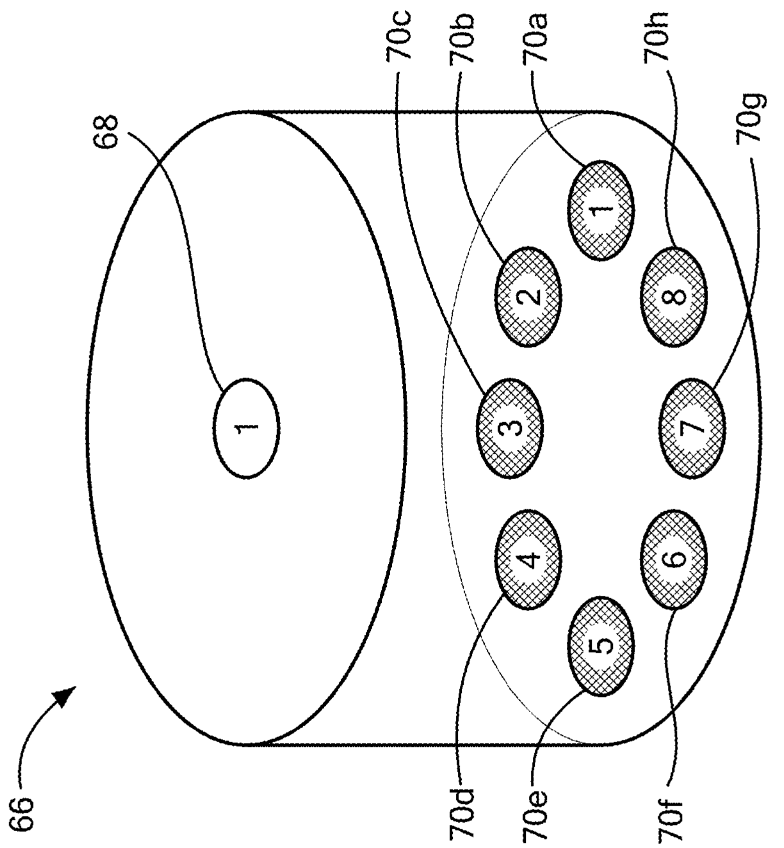
FIG. 8 is a block diagram of an IBFD antenna having a single transmit antenna element and eight (8) receive antenna elements.

Referring now to FIG. 8, an example IBFD antenna 66 comprises a single transmit antenna element 68 and eight (8) receive antenna elements 70*a*-70*h*. In this example embodiment, the receive antenna elements are disposed in a circular pattern in a single plane. Other embodiments are of course, also possible. The receive antenna elements may be the same as or similar to the probe-fed wide-angle short horn antennas described above in conjunction with FIGS. 3A and 3B. As can be seen in FIG. 8, the transmit antenna is disposed at or about a center point of the eight (8) receive antenna elements. In embodiments, transmit antenna is disposed in a plane which is different than the plane in which the receive antenna elements are disposed. In embodiments, transmit antenna may be disposed in a plane which is either above or below the plane in which the receive antenna elements are disposed.

It should be noted that to generate difference patterns, and implement adaptive beamforming this example antenna embodiment requires zero analog splitters, four analog combiners 55 (which may, for example, be provided as part of a combiner network such as combiner network 54 in FIG. 4) and has 4 pattern ambiguities. This is because when the opposing elements are combined 180-degrees out of phase, the resulting patterns are figure-eight shaped with the same radiation coverage in both the front and back. This makes it difficult to determine if the signals are arriving from the front or back, which creates an ambiguity (for the four (4) pairs, four (4) ambiguities exist).

It is noted that the above assumes the use of four (4) receive channels (hence the reason for ambiguities), As will be appreciated by one of ordinary skill in the art, if a sufficient number of receive channels are used, then it is possible to utilize the configuration of FIG. 8 without creating ambiguities.

IBFD antennas provided in accordance with the concepts described herein find application in a wide variety of applications including but not limited to wireless networking applications, wireless communication applications and other applications. It is noted that wireless networking specifications may contain provisions related to vehicle-to-everything (e.g., V2X) operation that can enable advanced driving functions, such as collision avoidance, cooperative lane change and remote driving options. In addition to these driving aides, vehicle-to-everything nodes (e.g., V2X nodes) may be tasked with performing multiple simultaneous functions, such as radar, communications and spectral sensing, which can be demanding for a wireless device operating in a traditional time-division duplex mode.

IBFD technology implemented in accordance with the concepts described herein can alleviate challenges such as the aforementioned challenges by providing a mechanism to access frequency spectrums more efficiently as well as host multiple functions at the same time. One fundamental concept/principle described herein is based on the fact that IBFD techniques enable wireless systems to simultaneously utilize the same frequency band for transmit and receive operation. This concept can help propel the adoption of vehicle-to-everything systems by allowing platforms to not only connect to multiple networks concurrently, but also do so in such a way that the spectral utilization is minimized.

This may be accomplished using tailored antenna designs, including those for vehicles, that offer the initial opportunity to combat the resulting self-interference (SI), and often focus on the direct path coupling of the transmitter to the receiver. Omnidirectional IBFD antennas have demonstrated high amounts of isolation using circular mode phasing for designs with monopole, horn and monocone elements.

While these antennas effectively suppress the SI, they do not provide any insight into the direction from which the signals are received, which can be used to improve communications links. For such a capability, IBFD directional phased arrays have been investigated, but tend to be expensive and complex to operate.

The IBFD antenna concepts described herein provide omnidirectional phasing using the circular modes and integrating a unique receive beamforming functionality suitable for use in wireless communications and other applications.

Although reference is sometimes made herein to particular types of antenna elements, it is appreciated that other antenna elements having similar functional and/or structural properties may be substituted where appropriate, and that a person having ordinary skill in the art would understand how to select such antenna elements and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to providing element "A" over element "B" include situations in which one or more intermediate elements (e.g., element "C") is between element "A" and element "B" as long as the relevant characteristics and functionalities of element "A" and element "B" are not substantially changed by the intermediate element(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

Accordingly, it should be understood that subject matter defined in the appended claims is not necessarily limited to the specific implementations described above. The specific implementations described above are disclosed as examples only.

What is claimed is:

1. An in-band full-duplex (IBFD) antenna comprising:

a transmit antenna configured to transmit signals at a first frequency at a first time and having a substantially omnidirectional radiation pattern;

a plurality of receive antenna elements configured to receive signals at the first frequency at the first time; and a combiner network having a plurality of inputs with each input coupled to receive a radio frequency (RF) analog signal from a respective one of the plurality of receive antenna elements, the combiner network configured to combine the RF analog signals provided thereto and provide a set of RF analog signals at M combiner network outputs thereof where M is an integer greater than or equal to 2;

an M channel receiver having M receiver inputs coupled to respective ones of the M combiner network outputs and having one or more receiver outputs, the M channel receiver configured to receive analog signals at the M inputs thereof and provide a digital signal at the one or more receiver outputs; and an adaptive beam forming network coupled to receive one or more digital signals from the one or more receiver outputs and configured to form a plurality of difference beams to determine a direction-of-arrival of a received signal; and the adaptive beam forming network comprises a plurality of analog combiners, each analog combiner configured to combine opposing sets of a plurality of horn antenna elements 180-degrees out of phase.

2. The IBFD antenna of claim 1, wherein:

the transmit antenna comprises a single monopole antenna element; and the receive antenna comprises a plurality of horn antenna elements.

3. The IBFD antenna of claim 2, wherein the plurality of horn antenna elements are disposed in a single plane.

4. The IBFD antenna of claim 2, wherein:

first ones of the plurality of horn antenna elements are disposed in a first plane and second ones of the plurality of horn antenna elements are disposed in a second, different plane.

5. The IBFD antenna of claim 4, wherein a number of the plurality of horn antenna elements disposed in a first plane is equal to a number of the plurality of horn antenna elements disposed in the second plane.

6. An in-band full-duplex (IBFD) antenna comprising:

a transmit antenna configured to transmit signals at a first frequency at a first time and having a substantially omnidirectional radiation pattern;

a receive antenna configured to receive signals at the first frequency at the first time; and means to perform adaptive beam forming coupled to the receive antenna, wherein:

the transmit antenna comprises a single monopole antenna element;

the receive antenna comprises a plurality of horn antenna elements;

first ones of the plurality of horn antenna elements are disposed in a first plane; and second ones of the plurality of horn antenna elements are disposed in a second, different plane, and a number of the first ones of the plurality of horn antenna elements disposed in the first plane is different than a number of the second ones of the plurality of horn antenna elements disposed in the second plane.

7. The IBFD antenna of claim 6, wherein the means to perform adaptive beam forming comprises:

a combiner network having a plurality of inputs with each input coupled to receive a radio frequency (RF) analog signal from the receive antenna, the combiner network configured to combine the RF analog signal provided thereto and provide a set of RE analog signals at M combiner network outputs thereof, where M is an integer greater an or equal to 2;

an M channel receiver having M receiver inputs coupled to respective ones of the M combiner network outputs and having one or more receiver outputs, the M channel receiver configured to receive analog signals at the M inputs thereof and provide a digital signal at the one or more receiver outputs to an adaptive beamformer network; and an adaptive beam forming network coupled to receive one or more signals from the one or m receiver outputs and configured to form a plurality of difference beams.

8. The IBFD antenna of claim 3, wherein the plurality of horn antenna elements are provided as a plurality of sets of horn antenna elements.

9. The IBFD antenna of claim 2, wherein the transmit antenna is disposed above the receive antenna.

10. An in-band full-duplex (IBFD) antenna comprising:

a transmit antenna configured to transmit signals at a first frequency at a first time and having a substantially omnidirectional radiation pattern;

a receive antenna configured to receive signals at the first frequency at the first time; and means to perform adaptive beam forming coupled to the receive antenna, wherein:

the transmit antenna comprises a single monopole antenna element;

the receive antenna comprises a plurality of horn antenna elements;

first ones of the plurality of horn antenna elements are disposed in a first plane; and second ones of the plurality of horn antenna elements are disposed in a second, different plane, and the IBFD antenna further comprising a plurality of probe feeds, with each probe feed coupled to a corresponding one of the plurality of horn antenna elements and wherein at least four probe-fed horn antenna elements are disposed in the first plane and at least four probe-fed horn antenna elements are disposed in the second plane.

11. The IBFD antenna of claim 10, wherein the transmit antenna is provided having an omnidirectional radiation pattern; and the adaptive beam forming means is configured to determine a direction-of-arrival (DoA) estimation of a received signal.

12. The IBFD antenna of claim 10, wherein the probe-fed horn antenna elements are configured to generate a plurality of difference patterns.

13. The IBFD antenna of claim 10, wherein the receive antenna is configured as a cylindrical array.

14. The IBFD antenna of claim 13, wherein the probe feeds are oriented at 180-degrees from each other around a circumference of the cylindrical array on opposing sides of the cylindrical array.

15. The IBFD antenna of claim 10 further comprising a radome disposed over the plurality of horn antenna elements.

16. An in-band full-duplex (IBFD) antenna comprising:

a. transmit antenna means configured for operation at a first frequency at a first time and having an omnidirectional radiation pattern;

b. receive antenna means configured for operation at the first frequency at the first time; and c. adaptive beamforming means coupled to the receive antenna means and configured to perform adaptive beamforming on signals provided thereto from the receive antenna means and configured to determine a direction-of-arrival of a received signal, wherein the receive antenna means comprises a first set of horn antenna elements being at least four horn antenna elements disposed in a first plane, and a second set of horn antenna elements being at least four horn antenna elements disposed in a second, different plane, and wherein the first and second set of horn antenna elements generate at least four difference patterns in azimuth on receive.

17. The IBFD antenna of claim 16, wherein:

the transmit antenna means comprises a single transmit monopole; and the receive antenna means comprises a plurality of horn antenna elements.

18. The IBFD antenna of claim 17, wherein the adaptive beamforming means comprises a plurality of analog combiners, each analog combiner configured to combine opposing sets of the plurality of horn antenna elements 180-degrees out of phase.

19. The IBFD antenna of claim 1, wherein the plurality of receive antenna elements are configured as a cylindrical array and the IBFD antenna further comprises a plurality of probe feed sets, where each probe feed set comprises two probe feeds oriented at 180-degrees from each other around a circumference of the cylindrical array on opposing sides of the cylindrical array.

* * * * *